United States Patent [19]

Kinlaw et al.

[11] Patent Number: 5,034,266

[45] Date of Patent: Jul. 23, 1991

[54] BREATHABLE FOAM COATED DURABLE PILLOW TICKING

[75] Inventors: William S. Kinlaw; Alfred F. Baldwin; Conrad D. Goad, all of Greensboro, N.C.

[73] Assignee: Precision Fabrics Group, Greensboro, N.C.

[21] Appl. No.: 350,830

[22] Filed: May 12, 1989

[51] Int. Cl.⁵ .................... B32B 27/00; B32B 5/18; B32B 5/22

[52] U.S. Cl. ................... 428/254; 428/262; 428/306.6; 428/311.1; 428/311.5; 428/316.6; 428/920; 428/921

[58] Field of Search ............... 428/262, 304.4, 306.6, 428/311.1, 311.5, 316.6, 920, 921, 254

[56] References Cited

U.S. PATENT DOCUMENTS

| | | | |
|---|---|---|---|
| 4,467,013 | 8/1984 | Baldwin | 428/289 |
| 4,499,139 | 2/1985 | Schortmann | 428/290 |
| 4,761,326 | 8/1988 | Barnes et al. | 428/219 |
| 4,910,078 | 3/1990 | Hill et al. | 428/289 |

*Primary Examiner*—William J. Van Balen
*Attorney, Agent, or Firm*—Finnegan, Henderson, Farabow, Garrett & Dunner

[57] ABSTRACT

Breathable and durable woven or knit ticking fabrics are prepared by foam-coating the fabric to provide good barrier properties to bacteria and liquids and post-cure treating the coated fabric to provide additional bacteriostatic or repellent properties.

14 Claims, 1 Drawing Sheet

BREATHABLE FOAM COATED DURABLE PILLOW TICKING

BACKGROUND OF THE INVENTION

This invention pertains to a unique type of barrier system used to produce high end durable ticking fabrics used to make hospital and institutional pillows and other similar articles. The barrier system utilized involves foam coating applied to the surface of a high quality fabric to impart fluid repellancy and bacteriostatic properties which are required for a durable hospital pillow.

In the hospital, durable pillows are exposed to numerous body fluids and cleaning solutions, thus requiring these articles to be repellant to such fluids as water, alcohol, oil, blood or solutions containing these fluids. Most of the high end durable ticking fabrics used today are either coated with vinyl type polymers and polyurethanes, or laminated with such products on woven fabrics. The result is a ticking fabric that is impermeable to fluids and can be wiped down very clean making stains an infrequent occurrence. The drawbacks of these high end durable pillows, however, are numerous. Since the pillows are impermeable, even under high pressures, they are not breathable, that is, air does not readily pass through the ticking structure. This causes several problems. Firstly, the pillows must be vented in order to collapse when someone rests their head on it. The venting is achieved by several methods including punching many very small holes in the material, using grommets, or leaving an uncoated or untreated area around the pillow. This venting serves to provide direct pathways for bacteria and fluids to pass directly through and into the pillow filling thus increasing the possibility of cross-contamination from patient to patient.

The result is a pillow that is repellant only in certain areas making a non-uniform barrier product. Secondly, by not being breathable, heat and moisture can build up between the patient and pillow ticking making it very uncomfortable. Thirdly, the products tend to be either stiff or noisy, again, creating an uncomfortable situation for a patient particularly one who is confined to the bed for extended periods of time.

The object of this invention is to produce a high end durable pillow ticking that displays uniform repellency to water, alcohol, oil and other hospital fluids, bacteriostatic properties and exhibit soil release properties when wiped or cleaned.

Another object is to provide a pillow ticking that is breathable without any artificial venting resulting in a softer, quieter, and more comfortable durable pillow than is currently available.

DETAILED DESCRIPTION OF THE INVENTION

Figure 1:
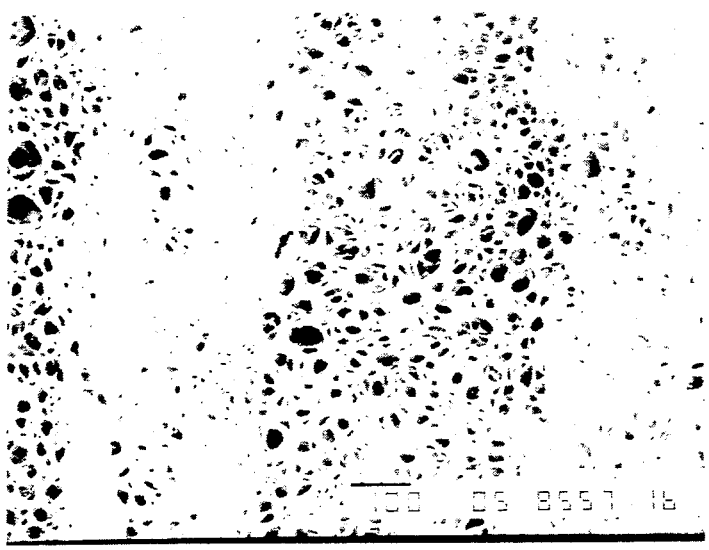
FIG. 1 Shows a ×100 photomicrograph of the foam coated side of the fabric of this invention, illustrating the porosity and distribution of open cell foam overlaying the fabric.

The fabric of this invention is based on any knit or woven fabric which is durable enough in nature to be used over an extended period of time and resistant to abrasion from being used which could compromise product performance. These fabrics may be composed of polyester, cellulosic, nylon, polypropylene, or combinations of such fibers.

Any suitable substrate must satisfy a number of requirements, listed below generally in order of priority. The fabric must be durable in nature and be quite strong with a grab tensile minimum of 30 pounds and a trap tear minimum of 5 pounds. It must be soft, quite, and flexible, with a hand that lends itself to this type of product.

While the fabric properties are very important, the main process by which the functionality of the product is achieved, is by foam coating with a stabilized foam. The coating is layed on the surface of an appropriate substrate forming a network of open cell foam distributed among and adhered to the surface fibers, and to a limited extent, penetrating the depth of the fabric. This open cell structure serves to fill gaps and holes in the substrate thus reducing the overall porosity of the fabric. In this manner, the foam acts as a physical barrier. In conjunction with the physical aspects, the foam compound itself can be given added chemical properties by adding or deleting property modifying chemicals such as, but not limited to, fluorocarbon repellants, flame retardant chemicals, antimicrobial agents, detackifying agents, etc. Thus, the foam coating acting both physically and chemically results in end use performance.

In addition to the foam barrier, an additional processing step may need to be utilized in order to achieve the stringent repellency requirements needed for a hospital pillow ticking. This process would involve the topical application of chemicals to the coated substrate. Again, the chemical applied could be any property modifying agent that is compatible with the other finish chemicals or the process in general. For the product of this invention, both a fluoropolymer repellant and an antimicrobial agent are applied topically to achieve the reported properties.

The coating composition is based upon a resin or combination of resins plus filler(s). Other necessary ingredients include a foaming aid or surfactant to assist in forming a stable foam plus any other reactants or auxiliaries required to cross-link the resin and form a foam that, upon drying and curing, remains stable and continues to exhibit the desired performance characteristics.

While not wishing to be limited exclusively to this group of polymers, a typical selection may be on acrylic, styrene-butadiene rubber, vinyl, acetate polyvinyl alcohol, urethane, vinyl chloride, vinylidene chloride or an acrylonitrile, with a preference being with those polymers which will exhibit flame resistance.

Common fillers such as titanium dioxide, clay and talc are used based on particular needs or requirements of the coating.

After all of the adjustments and additions are made, the foam compound should meet certain specifications. Total solids of the coating compound should range from 40% to 70% by weight. The pH of the composition may be adjusted by the addition of a suitable base, such as ammonia to maintain a pH in the range of 8-11.

The coating composition, prior to foaming should have a viscosity from 400 to 2,900 centipoise. (mPa.S) The coating is maintained and applied at a temperature of 70° F. to 110° F.

The coating composition is mechanically foamed in a foam generator such as an Oaks foamer or a L.E.S.S. model 500 super foamer to achieve a ratio from three to twenty parts air to one part coating composition, with a ratio of 3:1-8:1 preferred.

The compound is then applied by any convenient means, such as a knife coater. The coater is adjusted to place a layer of foam on the surface of the substrate, known as a surface coating or gap coating. Some foam may penetrate into the substrate, however, the vast majority of the coating is on one side. The coating dry addon should be in the range of 0.7 to 2.5 oz. per square yard.

The fabric is then dried at 150° F.-300° F. in a conventional hot air tenter frame, infrared, belt, or drum dryer to a point where 2 to 15 percent moisture is retained, in other words it is not bone dry. This retained moisture allows the coating to be crushed between a set of rollers such as rubber over steel, steel over steel, or steel over rubber. Crushing compacts the foam onto the fabric thus effectively decreasing the porosity and pore size of the coating, while increasing the abrasion resistance. The substrate is then dipped through a finish bath and post cured at 230° F. to 325° F. depending on the type of fibers used in the fabric. The top finish could be omitted, and the fabric just cured if properties after curing were adequate for the end use.

The following is typical formulation for the foam compound prior to foaming. Amounts we expressed on a parts per hundred by weight.

| Ingredients | Dry Parts |
|---|---|
| Aqueous polyermer dispersion (40-50% active) | 20-60 |
| melamine resin | .5-10.0 |
| filler: clay, talc, etc. | 15-45 |
| ammonium stearate (21%) | 1-7 |
| pigment | as needed |
| catalyst | 1-1.5 |
| thickeners | as needed |
| property modifiers (flame retardant, water repellent, antistat, etc.) | as needed |

After foaming, coating, curing, and applying any top-finish needed, the fabric should exhibit the following range of properties for functional use.

| | | |
|---|---|---|
| base weight (oz/yd²) | | 2.0-5.0 |
| grab tensile (lbs) | MD | 30 minimum |
| INDA 110.0-70 (R82) | XD | 30 minimum |
| spray rating | | 70-100 |
| INDA 80.1-70 (R82) | | |
| Frazier air permeability (Ft³/min/Ft²) | | 30-120 |
| INDA 70.1-70 (R82) | | |
| alcohol repellency | | 7-10 |
| INDA 80.9-74 (R82) | | |
| oil repellency - 3M Scotchguard | | 3-6 |
| INDA 80.8-70 (R82) | | |
| Suter hydrostatic head (cm) | | 15 minimum |
| INDA 80.6-70 (R82) | | |
| Flammability: NFPA 702 (pass/fail) | | PASS |
| antimicrobial presence (pass/fail) | | PASS |

EXAMPLE

A foam-coated durable pillow ticking was prepared. First a foamable composition containing the following ingredients was prepared in parts per hundred in weight:

| | Dry Parts | Wet Parts |
|---|---|---|
| foam compound (DG-1, High Point Chemical) | 97.1 | 94.4 |
| fluoropolymer (Zonyl NWA, Dupont) | 2.3 | 4.7 |
| Pigment (Inmont Pad N. Blue 37 BASF) | .3 | .4 |
| catalyst (accelerator UTX, American Cyanamid) | .3 | .5 |

This formulation was dispersed in air using a mechanical foam generator and then applied to a 3.25 oz. per square yard, polyester warp knit fabric using a knife-over-roll coater. The foam was applied to the surface of the substrate by setting a gap between the fabric and knife so as to end up with a 1.0 to 1.4 oz. per square yard dry add on. The fabric was dried in a hot air tenter frame at 275° F. for from 30 to 45 seconds.

The foam coated fabric was then post-treated to impart or enhance the bacteriostatic and repellent properties with a solution of:

| | % on wt. of bath |
|---|---|
| isopropyl alcohol (penetrant) | 1.2 |
| antimicrobial (DC 5700, Dow Corning) | 2.4 |
| fluorochemical (FC-824: 3M) | 3.8 |

Figure 2:
FIG. 2 A ×100 photomicrograph of the same fabric on the uncoated side, illustrating that this side is substantially devoid of foam. The only foam network visible is that which filled small gaps in the fabric.
Figure 3:
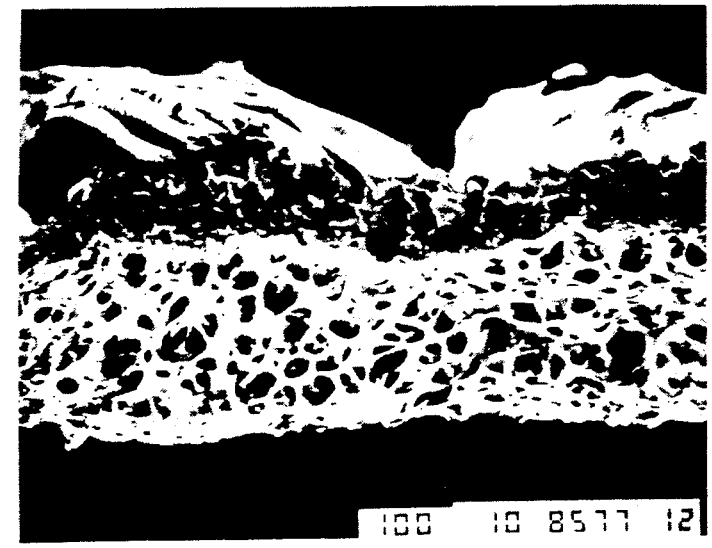
FIG. 3 A ×150 cross-section photomicrograph of the same fabric, again illustrating that by far the majority of the foam is located on one surface of the substrate.

This solution was applied in a pad bath, dried and cured at 300° F. for 45 seconds. The foam was crushed by the nip rollers of the pad. The photographs of FIGS. 1 & 2 are of the product so produced. The finished product was tested and had the following properties:

| | | |
|---|---|---|
| basis weight (oz/yd²) | | 4.2-4.6 |
| grab tensile (lbs) | MD | 82.3-109.6 |
| INDA 110.0-70 (R82) | XD | 96.8-129.7 |
| spray rating | | 90-100 |
| INDA 80.1-70 (R82) | | |
| Frazier air permeability (ft³/min/ft²) | | 45-95 |
| INDA 70.1-70 (R82) | | |
| Alcohol repellency | | 8-9 |
| INDA 80.9-74 (R82) | | |
| oil repellency | | 4-6 |
| INDA 80.8-70 (R82) | | |
| Suter Hydrostatic Head (cm) | | 16.1-22.3 |
| INDA 80.6-70 (R82) | | |
| Flammability: NFPA 702 (pass/fail) | | PASS |
| antimicrobial presence (pass/fail) | | PASS |

What is claimed is:

1. A breathable, flexible, repellant, wipeable, reusable foam-coated woven or knit ticking fabric composed of a woven or knit fabric coated and distributed over the surface thereof with a foam coating forming an open cell foam network distributed among and adhered to the fabric's surface fibers, with the other surface of the fabric being substantially devoid of the foam coating, the coated fabric having a spray rating (INDA 80.1-70)

of from 70 to 100, a Frazier Air Permeability (INDA 70.1-70) between 30 to 120 ft$^3$/min/ft$^2$ and a Suter hydrostatic head (INDA 80.6-70) of at least 15 centimeters.

2. The foam-coated ticking fabric of claim 1, in which the fabric is composed of polyester fibers, cellulosic fibers, nylon fibers, polypropylene fibers, or blends of two or more of these fibers.

3. The foam-coated ticking fabric of claim 1, in which the foam coating remains substantially on one surface of the fabric and the center of the fabric is substantially completely devoid of the foam coating.

4. The foam-coated ticking fabric of claim 1, in which the foam contains a polymeric binder selected from the group consisting of acrylic, styrene-butadiene rubber, vinyl acetate, polyvinyl alcohol, urethane, vinyl chloride, vinylidene chloride or an acrylonitrile polymer, together with at least one filler or opacifying agent and a fluorocarbon water repellant.

5. The foam-coated ticking fabric of claim 1, in which the foam coating includes an antimicrobial agent.

6. The foam-coated ticking fabric of claim 1, in which the foam coating contains a flame retardant.

7. The foam-coated ticking fabric of claim 1, having at least a Class I flammability rating according to Federal Specification 16 CFR Section 1610.

8. The foam-coated ticking fabric of claim 1, having an alcohol repellency (INDA 80.8-70) of from 8-10.

9. The foam-coated ticking fabric of claim 1, having an oil repellency (INDA 80.8-70) of at least 3.

10. The foam-coated ticking fabric of claim 1, treated with an antimicrobial agent.

11. A breathable, flexible, fluid repellant, wipeable, reusable foam-coated woven or knit ticking fabric composed of a woven or knit ticking fabric having a grab tensile strength of at least 30 pounds and a trap tear strength of at least 5 pounds, the fabric having one surface coated with an open cell foam network distributed amount and adhered to the fabric's surface fibers, with the opposite surface of the fabric being substantially devoid of foam coating, the foam containing a polymeric binder, at least one opacifying agent or filler and at least one of a fluorocarbon water repellant, a flame retardant, a detackifying agent, or an antimicrobial agent, the coated fabric having a spray rating (INDA 80.1-70) of from 70 to 100, a Frazier Air Permeability (INDA 70.1-70) between 30 and 120 ft$^3$/min/ft$^2$ and a Sutter hydrostatic head (INDA 80.6-70) of at least 15 centimeters.

12. The foam-coated ticking fabric of claim 11, finished with an antimicrobial agent.

13. The foam-coated ticking fabric of claim 11, finished with a fluorocarbon water repellant.

14. The foam-coated ticking fabric of claim 13, in which the foam contains a fluorocarbon water repellant.

* * * * *

UNITED STATES PATENT AND TRADEMARK OFFICE
CERTIFICATE OF CORRECTION

PATENT NO. : 5,034,266
DATED : July 23, 1991
INVENTOR(S) : W. S. KINLAW ET AL.

It is certified that error appears in the above-identified patent and that said Letters Patent is hereby corrected as shown below:

Column 4, line 61, cancel beginning with "1. A breathable, flexible, repellant" to and including "ters." in column 5, line 4 and insert the following claim:

--1. A breathable, flexible, repellant, wipeable, reusable foam-coated woven or knit ticking fabric composed of a woven or knit fabric having a grab tensile strength of at least 30 pounds and a trap tear strength of at least 5 pounds, and coated with a foam coating distributed substantially over the surface thereof and forming an open cell foam network remaining substantially on one surface of the fabric and distributed among and adhered to the fabric's surface fibers, with the other surface of the fabric being substantially devoid of the foam coating, the resultant foam-coated fabric being treated to impart or enhance the bacteriostatic ore repellent properties thereof and having a Frazier Air Permeability (INDA 70.1-70) between 30 to 120 $ft^3/min/ft^2$ and a Suter hydrostatic head (INDA 80.6-70) of at least 15 centimeters.--

In claim 11, line 12, delete "a tackifying agent."

UNITED STATES PATENT AND TRADEMARK OFFICE
CERTIFICATE OF CORRECTION

PATENT NO. : 5,034,266

DATED : July 23, 1991

INVENTOR(S) : W. S. KINLAW ET AL.

It is certified that error appears in the above-identified patent and that said Letters Patent is hereby corrected as shown below:

In claim 11, line 12, delete "a tackifying agent."

Signed and Sealed this

Third Day of November, 1992

*Attest:*

DOUGLAS B. COMER

*Attesting Officer*     *Acting Commissioner of Patents and Trademarks*